(12) United States Patent
Hampel, III

(10) Patent No.: US 12,118,584 B1
(45) Date of Patent: Oct. 15, 2024

(54) BLOCKCHAIN BASED DIGITAL COUPON PROCESSING SYSTEM AND RELATED METHODS

(71) Applicant: Inmar Clearing, Inc., Winston-Salem, NC (US)

(72) Inventor: Joseph F. Hampel, III, Winston-Salem, NC (US)

(73) Assignee: INMAR CLEARING, INC., Winston-Salem, NC (US)

( * ) Notice: Subject to any disclaimer, the term of this patent is extended or adjusted under 35 U.S.C. 154(b) by 142 days.

(21) Appl. No.: 17/899,650

(22) Filed: Aug. 31, 2022

(51) Int. Cl.
  *G06Q 30/02* (2023.01)
  *G06Q 20/36* (2012.01)
  *G06Q 20/38* (2012.01)
  *G06Q 30/0207* (2023.01)
  *G06Q 30/0238* (2023.01)
  *G06Q 30/0601* (2023.01)

(52) U.S. Cl.
  CPC ..... *G06Q 30/0238* (2013.01); *G06Q 20/3674* (2013.01); *G06Q 20/389* (2013.01); *G06Q 30/0225* (2013.01); *G06Q 30/0625* (2013.01); *G06Q 2220/00* (2013.01)

(58) Field of Classification Search
  CPC ........... G06Q 30/0238; G06Q 20/3674; G06Q 20/389; G06Q 30/0225; G06Q 30/0625; G06Q 2220/00
  See application file for complete search history.

(56) References Cited

U.S. PATENT DOCUMENTS

| | | | |
|---|---|---|---|
| 10,252,145 | B2 | 4/2019 | Tran et al. |
| 2018/0285912 | A1* | 10/2018 | Thibedeau ............. G06Q 30/02 |
| 2020/0005284 | A1 | 1/2020 | Vijayan |
| 2021/0366586 | A1* | 11/2021 | Ryan .................. G06Q 20/3224 |
| 2022/0366762 | A1* | 11/2022 | Nelson ................ G07F 17/3244 |
| 2022/0384027 | A1* | 12/2022 | Kaleal, III ................ A61B 5/11 |
| 2023/0062776 | A1* | 3/2023 | Vosseller ............. G06Q 30/018 |
| 2023/0289668 | A1* | 9/2023 | Frix ........................ G06Q 10/02 |
| 2023/0394455 | A1* | 12/2023 | Meyers .............. G06Q 20/3674 |
| 2024/0005354 | A1* | 1/2024 | Rush .................. G06Q 30/0226 |
| 2024/0033639 | A1* | 2/2024 | Meyers ................... A63F 13/69 |

FOREIGN PATENT DOCUMENTS

WO    WO 2023214398 A1 *  6/2022

\* cited by examiner

*Primary Examiner* — Thuy N Nguyen
(74) *Attorney, Agent, or Firm* — ALLEN, DYER, DOPPELT, + GILCHRIST, P.A.

(57) ABSTRACT

A digital coupon processing system may include a user device and a digital coupon processing server. The server may generate a digital coupon for a given product for purchase, cooperate with a blockchain server to generate a non-fungible token (NFT) associated with the digital coupon on a blockchain, and place the NFT into a redeemable account on the blockchain. The server may also assign a unique coupon identifier (UCI) to the NFT, and communicate the digital coupon and UCI to the user device for redemption. The server may also, upon redemption of the digital coupon, obtain the UCI from the given shopper, and determine if the NFT is on the redeemable account on the blockchain based upon the UCI, and when so, cooperate with a point-of-sale (POS) device to apply the digital coupon to the product for purchase, and transfer the NFT to a non-redeemable account on the blockchain.

23 Claims, 5 Drawing Sheets

BLOCKCHAIN BASED DIGITAL COUPON PROCESSING SYSTEM AND RELATED METHODS

TECHNICAL FIELD

The present invention relates to the field of blockchain, and, more particularly, to blockchain based digital coupon processing, and related methods.

BACKGROUND

Sales of a particular product or service may be based upon how well that product or service is marketed to a consumer. One form of marketing or promotion is a coupon, typically in paper form, for a discount toward the product or service. Some coupons may be retailer specific, for example, only redeemable for the discount at a particular retailer, while other coupons may be product specific from a manufacturer and redeemable at any retailer.

A coupon, while typically in paper form, may be in digital form and may be referred to as a digital promotion. A digital promotion may be selected or "clipped" via a mobile phone and saved to a digital wallet for redemption at a point-of-sale (POS) terminal, for example. A typical coupon is applicable to a given product and has a redeemable value that may vary based upon, for example, the quantity of a given item, brand of item, size of the product in terms of packaging, and/or the price point of the given item. A typical coupon may also be redeemable only at a given retailer and/or within a threshold time period. Other promotional terms may include companion product and purchase quantity requirements.

SUMMARY

A digital coupon processing system may include a user device associated with a given shopper and a digital coupon processing server. The digital coupon processing server may be configured to generate a digital coupon for a given product for purchase, cooperate with a blockchain server to generate a non-fungible token (NFT) associated with the digital coupon on a blockchain, and place the NFT into a redeemable account on the blockchain. The digital coupon processing server may also be configured to assign a unique coupon identifier (UCI) to the NFT, and communicate the digital coupon and UCI to the user device for redemption. The digital coupon processing server may be configured to, upon redemption of the digital coupon at a point-of-sale (POS) device, obtain the UCI from the given shopper, and determine if the NFT is on the redeemable account on the blockchain based upon the UCI, and when so, cooperate with the POS device to apply the digital coupon to the product for purchase, and transfer the NFT to a non-redeemable account on the blockchain.

The redeemable account and the non-redeemable account may be owned by a common entity, for example. The digital coupon processing server may be configured to obtain at least one product identifier associated with a corresponding product being purchased, determine if the product identifier is associated with the given product for purchase, and when so, determine if the NFT is on the redeemable account.

The at least one product identifier may include at least one of a stock keeping unit (SKU) and a uniform product code (UPC), for example. The digital coupon processing server may be configured to, upon redemption, when the NFT is on the redeemable account, authenticate the NFT based upon the UCI and transfer the NFT to a non-redeemable account on the blockchain based upon the authentication.

The digital coupon processing server may be configured to cooperate with the user device to store the digital coupon in a digital wallet associated with the given shopper, for example. The given shopper may have a product purchase history associated therewith, and the digital coupon processing server may be configured to generate the digital coupon to be redeemable toward the given product based upon the product purchase history.

The digital coupon processing server may be configured to, upon redemption, when the NFT is not on either of the redeemable or non-redeemable accounts, generate and communicate a fraud notification, for example. The digital coupon processing server may be configured to, upon redemption, when the NFT is on either of the redeemable or non-redeemable accounts, generate and communicate a coupon-used notification, for example.

A method aspect is directed to a method of processing a digital coupon. The method may include using a digital coupon processing server to generate a digital coupon for a given product for purchase, cooperate with a blockchain server to generate a non-fungible token (NFT) associated with the digital coupon on a blockchain, and place the NFT into a redeemable account on the blockchain. The method may further include using the digital coupon processing server to assign a unique coupon identifier (UCI) to the NFT, and communicate the digital coupon and UCI to a user device associated with a given shopper for redemption. The digital coupon processing server may also be used to, upon redemption of the digital coupon at a point-of-sale (POS) device, obtain the UCI from the given shopper, and determine if the NFT is on the redeemable account on the blockchain based upon the UCI, and when so, cooperate with the POS device to apply the digital coupon to the product for purchase, and transfer the NFT to a non-redeemable account on the blockchain.

A computer readable medium aspect is directed to a non-transitory computer readable medium for processing a digital coupon. The non-transitory computer readable medium includes computer executable instructions that when executed by a processor of a digital coupon processing server cause the processor to perform operations. The operations may include generating a digital coupon for a given product for purchase, cooperating with a blockchain server to generate a non-fungible token (NFT) associated with the digital coupon on a blockchain, and placing the NFT into a redeemable account on the blockchain. The operations may also include assigning a unique coupon identifier (UCI) to the NFT, and communicating the digital coupon and UCI to a user device associated with a given shopper for redemption. The operations may also include, upon redemption of the digital coupon at a point-of-sale (POS) device, obtaining the UCI from the given shopper, and determining if the NFT is on the redeemable account on the blockchain based upon the UCI, and when so, cooperating with the POS device to apply the digital coupon to the product for purchase, and transferring the NFT to a non-redeemable account on the blockchain.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
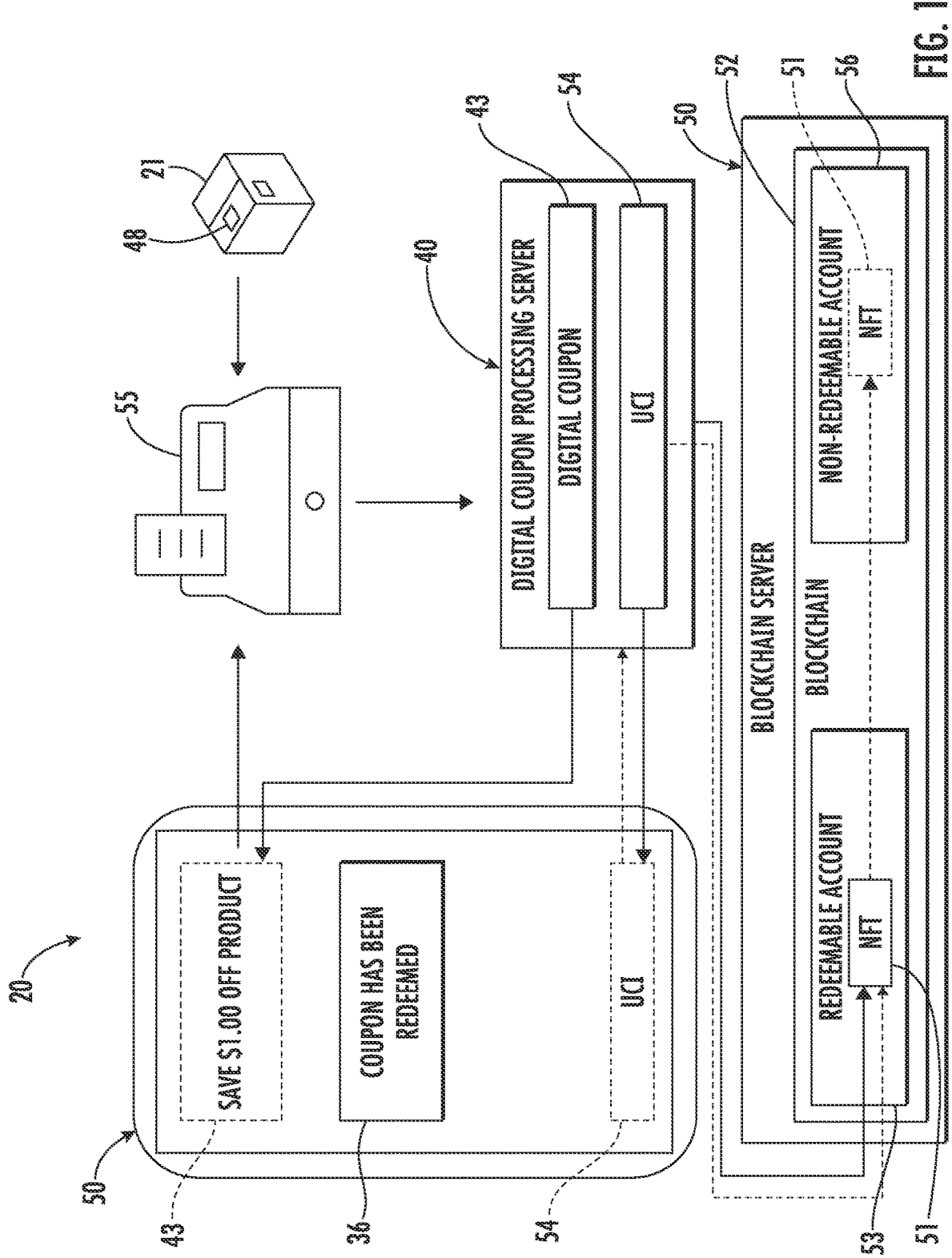
FIG. 1 is a schematic diagram of a digital coupon processing system in accordance with an embodiment.
Figure 2:
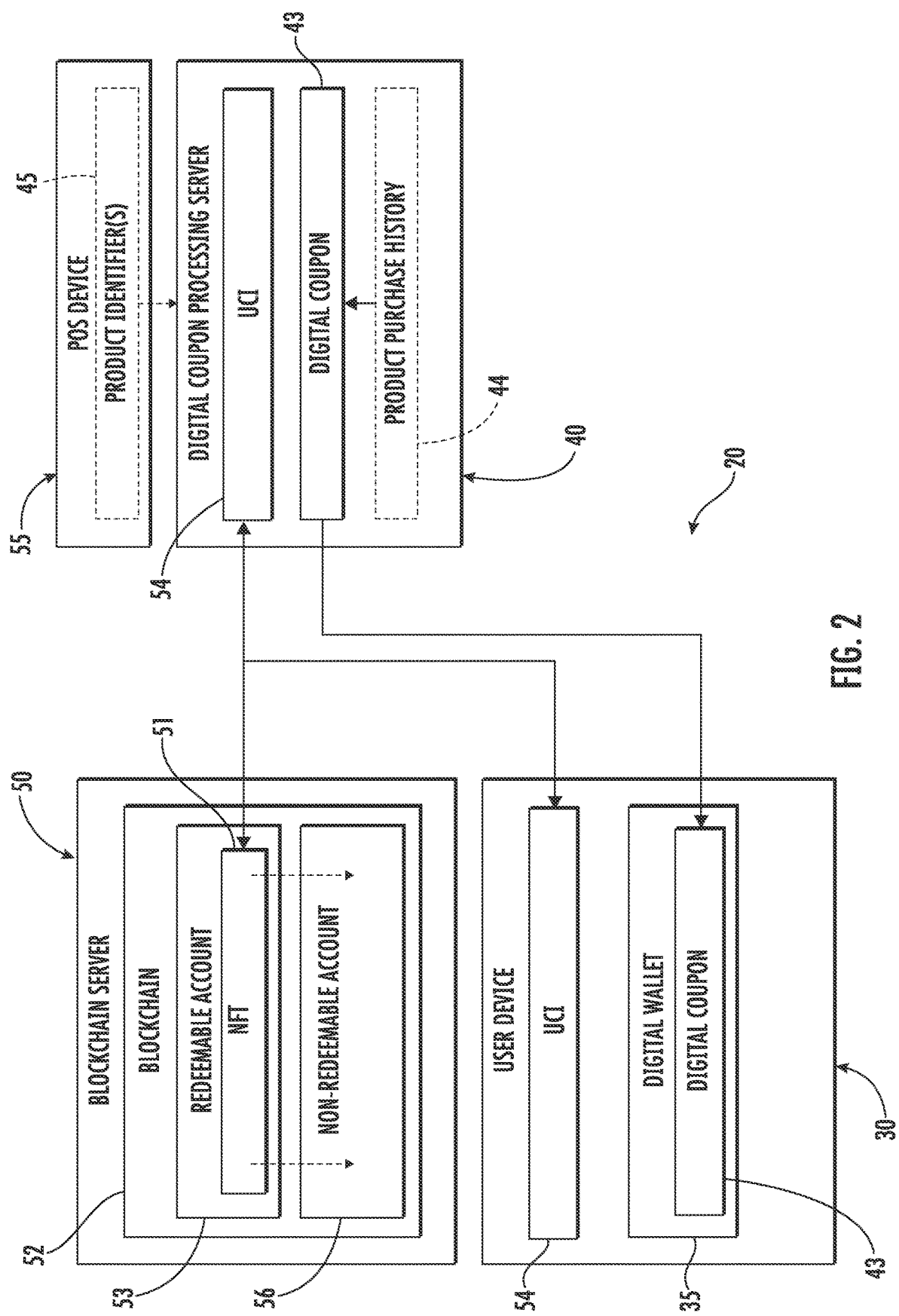
FIG. 2 is another schematic diagram of the digital coupon processing system of FIG. 1.
Figure 3:
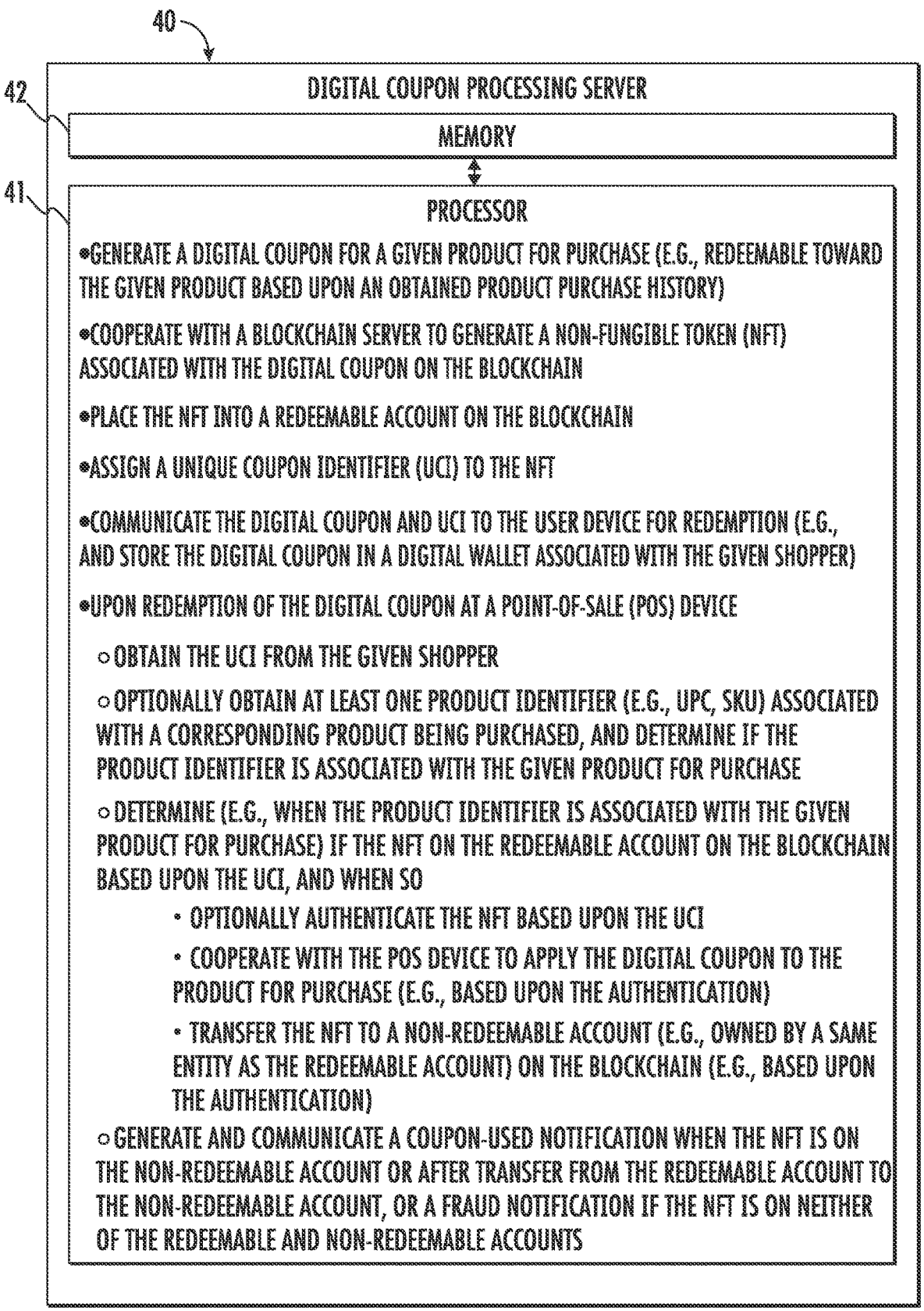
FIG. 3 is a schematic block diagram of the digital coupon processing server of FIG. 1.

Referring initially to FIGS. 1-3, a digital coupon processing system 20 includes a user device 30. The user device 30 may be associated with a shopper, for example, and may be in the form of a mobile wireless communications device, such as a mobile phone or smartphone. Of course, the user device 30 may be another type of device, such as, for example, a personal computer, a tablet computer, or a wearable computer.

The digital coupon processing system 20 also includes a digital coupon processing server 40. The digital coupon processing server 40 includes a processor 41 and an associated memory 42. While operations of the digital coupon processing server 40 are described herein, it should be appreciated by those skilled in the art that the operations are performed through cooperation of the processor 41 and the memory 42.

Figure 4A:
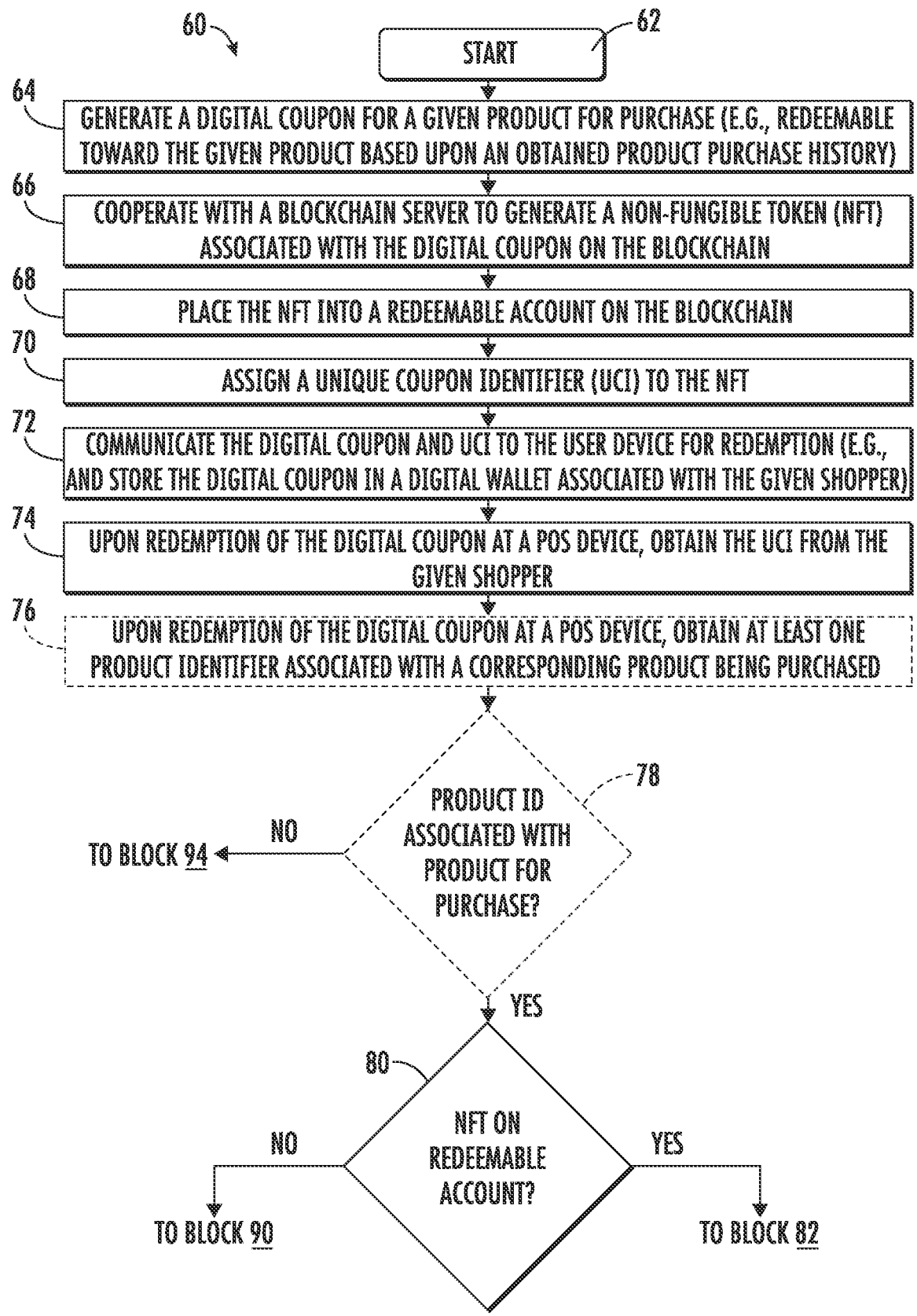
FIGS. 4a and 4b are flow diagrams illustrating operation of the digital coupon processing server of FIG. 1.
Figure 4B:
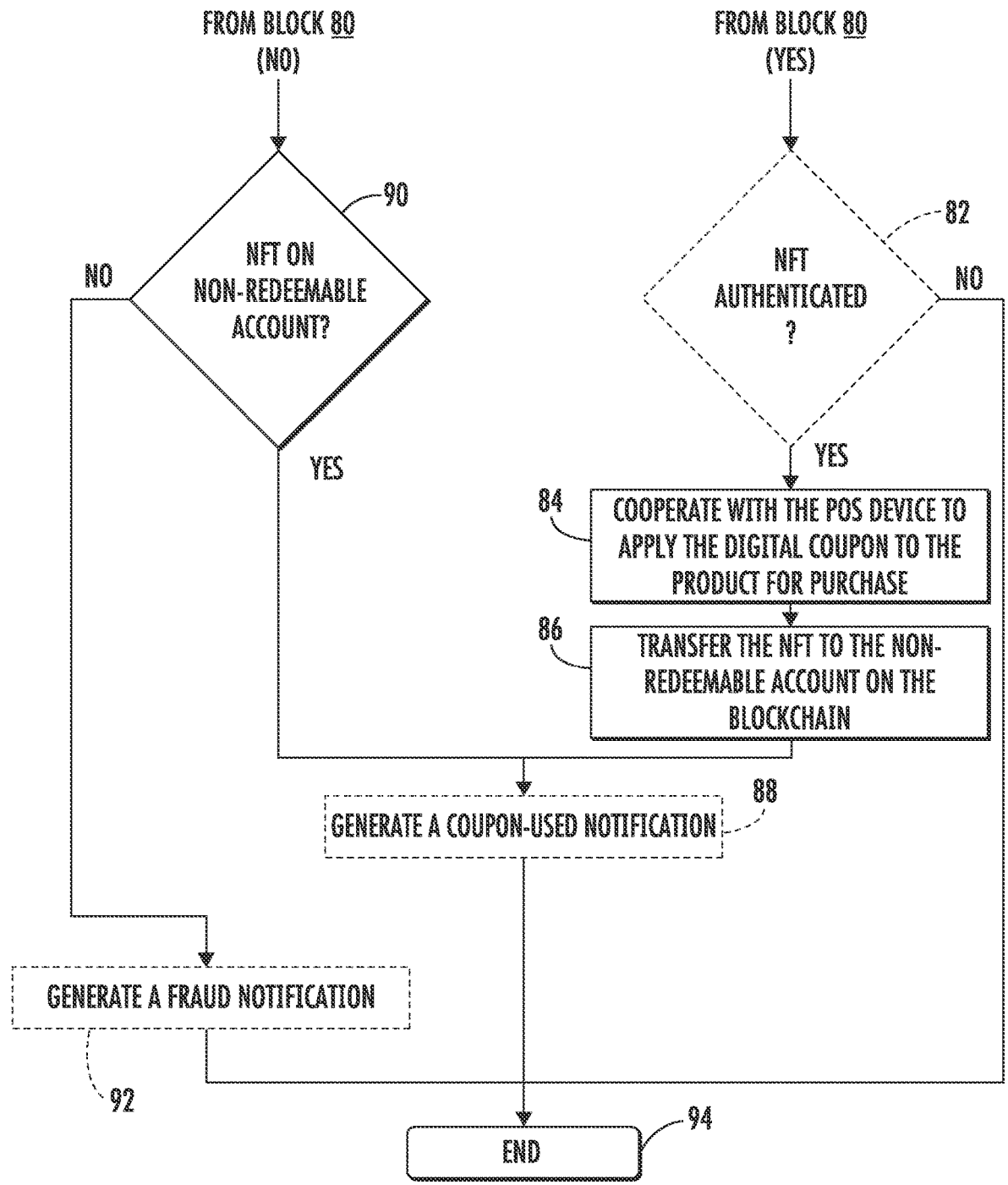

Referring now additionally to the flowchart 60 in FIGS. 4a and 4b, beginning at Block 62, operations of the digital coupon processing server 40 will be described. At Block 64, the digital coupon processing server 40 generates a digital coupon 43 for a given product for purchase 21. The digital coupon processing server 40 may generate the digital coupon 43 in accordance with a campaign from a retailer or manufacturer. For example, a manufacturer may desire to have a promotional campaign that provides a digital coupon having a redeemable value toward purchase of one or more product. The digital coupon 43 may have a coupon identifier associated therewith to identify, for example to a point-of-sale (POS) device, the digital coupon for application of the redeemable value.

The digital coupon processing server 40 may obtain and/or store a product purchase history 44 associated with the given shopper. The product purchase history 44 may be obtained from a POS device, for example. The product purchase history 44 may include information about previous (and current) product purchases by the given shopper. More particularly, the product purchase history 44 may include product identifiers (e.g., uniform product code (UPC), stock keeping unit (SKU), etc.), product purchase time and date, product quantities and pricing, location of purchases, and whether a coupon was applied, for example.

Accordingly, the digital coupon processing server 40 may generate the digital coupon 43 based upon the product purchase history 44. In other words, the digital coupon processing server 40 may generate the digital coupon 43 to be targeted, for example, for a particular given product based upon the product purchase history 44. Thus, the digital coupon 43 may be redeemable toward different products depending on the shopper. Of course, in some embodiments the digital coupon 43 may be redeemable toward a same product for purchase regardless of shopper.

The digital coupon processing server 40, at Block 66, cooperates with a blockchain server 50 to generate a non-fungible token (NFT) 51. The NFT 51 is associated with the digital coupon 43 on a blockchain 52. The digital coupon processing server 40 places the NFT 51 into a redeemable account 53 on the blockchain 52 (Block 68) and assigns a unique coupon identifier (UCI) 54 to the NFT (Block 70). The UCI 54 may be any unique identifier associated with the NFT, for example, and stored in a database in the memory 42. The UCI 54 may also serve as the digital coupon identifier, for example. The blockchain 52, and thus the NFT 51, is stored on the blockchain server 50, and not on the digital coupon processing server 40, for example, to maintain integrity of the blockchain. Of course, in some embodiments, the blockchain 52 may be stored on the digital coupon processing server 40.

The digital coupon processing server 40 communicates the digital coupon 43 to the user device 30, for example, wirelessly (Block 72). The digital coupon processing server 40 may cooperate with the user device 30 to optionally store the digital coupon 43 in a digital wallet 35 associated with the given shopper.

Upon redemption of the digital coupon 43 at a POS device 55, the digital coupon processing server 40 obtains the UCI 54 from the given shopper (Block 74). The POS device 55 may be in the form of a POS terminal, for example. The POS device 55 may be in the form of a portable or mobile wireless communications device (e.g., tablet or mobile phone) configured to process payments, for example, using one or more of the camera and/or interconnected device, such as, payment card swipe terminals.

The POS device 55 may wirelessly obtain the UCI 54 when in proximity of the POS device, for example, using a short-range wireless protocol, such as, for example, Bluetooth or NFC. The UCI 54, when in the form of an alphanumeric code, may be manually input at the POS device 55. The UCI 54 may be in the form of a machine-readable code (e.g., barcode, QR code) displayed on the display of the user device 30, for example, and may be optically scanned at the POS device 55. The digital coupon server 40 may cooperate with the user device 30, for example, when the digital coupon is stored in a digital wallet 35, to obtain the UCI 54 from the digital wallet. The digital coupon processing server 40 may obtain the UCI 54 during redemption, for example, at the conclusion of a purchase transaction.

The digital coupon processing server 40, upon redemption of the digital coupon 43, may obtain a product identifier 45 associated with the corresponding product being purchased (Block 76). The product identifier 45 may be a SKU or UPC, for example. At Block 78 the digital coupon processing server 40 may determine if the product identifier 45 is associated with the given product for purchase 21. In other words, the digital coupon processing server 40 may determine or verify whether the given shopper is purchasing the product associated with the digital coupon 43, for example, based upon a comparison of product identifiers obtained from the POS device 55 for products being purchased and obtained identification of the digital coupon 43 (e.g., coupon identifier, UCI 54, etc.).

If, at Block 78, the digital coupon processing server 40 determines that the given product for purchase 21 is being purchased (i.e., the product identifier 45 is associated with the given product for purchase), the digital coupon processing server determines if the NFT 51 is on the redeemable account 53 on the blockchain 52 based upon the UCI 54 (Block 80). In other words, the digital coupon processing server 40 may use the UCI 54 as an index to locate the NFT 51 on the redeemable account 53 on the blockchain 52. If, at Block 78, the given product for purchase 21 is not being purchased, for example, after polling for the associated product identifier, (i.e., product identifiers are not associated with the given product for purchase), operations end at Block 94.

When the NFT 51 is on the redeemable account 53 on the blockchain 52 (Block 80), the digital coupon processing server 40, for example, in cooperation with the blockchain server 50, authenticates the NFT based upon the UCI 54 (Block 82). For example, the digital coupon processing server 40 may cooperate to confirm ownership of the NFT 51 and analyze any contract origin or metadata associated with the NFT, which may include or be associated with the UCI 54. The digital coupon processing server 40 may alternatively or additionally authenticate the NFT 51 based upon an authentication protocol, for example, PRüF, as will be appreciated by those skilled in the art.

If the NFT is authenticated at Block 82, the digital coupon processing server 40 cooperates with the POS device 55 to apply the digital coupon 43 to the product for purchase 21 (Block 84). If the NFT 51 is not authenticated at Block 82, operations end at Block 94.

Upon application of the digital coupon 43 to the given product for purchase 21, the digital coupon processing server 40 transfers the NFT 51 to a non-redeemable account 56 on the blockchain 52 (Block 86). Those having ordinary skill in the art will appreciate that the digital coupon processing server 40 may instruct, or cooperate with, the blockchain server 50 to transfer the ownership of the NFT 51, as determined by the transfer between the redeemable account 53 and the non-redeemable account 56. In other words, redeemed digital coupons 43 are placed in the non-redeemable account 56. While ownership of the NFT 51 is considered to be transferred upon transfer from the redeemable account 53 to the non-redeemable account 56, the actually entity ownership (e.g., a same company) may own the redeemable and non-redeemable accounts.

The digital coupon processing server 40 may, at Block 88, generate and communicate a coupon-used notification 36. The digital coupon processing server 40 may communicate the coupon-used notification to the user device 30 for display thereon or to the POS device 55 for display thereat or thereon.

If at Block 80 the NFT 51 is not on the redeemable account 53 on the blockchain 52, the digital coupon processing server 40 determines whether the NFT is on the non-redeemable account 56 on the blockchain (Block 90). If the NFT 51 is on the non-redeemable account 56, the digital coupon processing server 40 generates and communicates the coupon-used notification 36 (Block 88).

If at Block 90, the NFT 51 is not on the non-redeemable account 56 (i.e., not already redeemed), and thus also not on the redeemable account 53, the digital coupon processing server 40 may generate and communicate a fraud notification (Block 92). The digital coupon processing server 40 may communicate the fraud notification to one or more of the user device 30 for display thereon, the POS device 55 for display thereon or thereat, the blockchain server 50, for example, to monitoring integrity of the blockchain 52, and/or to other devices or servers, as will be appreciated by those skilled in the art. Operations end at Block 94.

As will be appreciated by those skilled in the art, the digital coupon processing system 20 may advantageously reduce digital coupon fraud. The digital coupon processing system 20 may also be advantageous for reducing fraud for paper coupons that are digitized for processing and redemption, for example. For example, the digital coupon processing system 20 may provide relatively quick authentication and redeemable status information with respect to a digital coupon, in addition to providing more secure redemption processing.

A method aspect is directed to a method of processing a digital coupon 43. The method includes using a digital coupon processing server 40 to generate a digital coupon 43 for a given product for purchase 21, cooperate with a blockchain server 50 to generate a non-fungible token (NFT) 51 associated with the digital coupon on a blockchain 52, and place the NFT into a redeemable account 53 on the blockchain. The method further includes using the digital coupon processing server 40 to assign a unique coupon identifier (UCI) 54 to the NFT 51, and communicate the digital coupon 43 and UCI to a user device 30 associated with a given shopper for redemption. The digital coupon processing server 40 is also used to, upon redemption of the digital coupon 43 at a point-of-sale (POS) device 55, obtain the UCI 54 from the given shopper, and determine if the NFT 51 is on the redeemable account 53 on the blockchain 52 based upon the UCI, and when so, cooperate with the POS device to apply the digital coupon to the product for purchase 21, and transfer the NFT to a non-redeemable account 56 on the blockchain.

A computer readable medium aspect is directed to a non-transitory computer readable medium for processing a digital coupon 43. The non-transitory computer readable medium includes computer executable instructions that when executed by a processor 41 of a digital coupon processing server 40 cause the processor to perform operations. The operations include generating a digital coupon 43 for a given product for purchase 21, cooperating with a blockchain server 50 to generate a non-fungible token (NFT) 51 associated with the digital coupon on a blockchain 52, and placing the NFT into a redeemable account 53 on the blockchain. The operations may also include assigning a unique coupon identifier (UCI) 54 to the NFT 51, and communicating the digital coupon 43 and UCI 54 to a user device 30 associated with a given shopper for redemption. The operations also include, upon redemption of the digital coupon 43 at a point-of-sale (POS) device 55, obtaining the UCI 54 from the given shopper, and determining if the NFT 51 is on the redeemable account 53 on the blockchain 52 based upon the UCI, and when so, cooperating with the POS device to apply the digital coupon to the product for purchase 21, and transferring the NFT to a non-redeemable account 56 on the blockchain.

While several embodiments have been described herein, it should be appreciated by those skilled in the art that any element or elements from one or more embodiments may be used with any other element or elements from any other embodiment or embodiments. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A digital coupon processing system comprising:
 a user device associated with a given shopper; and
 a digital coupon processing server configured to generate a digital coupon for a given product for purchase, cooperate with a blockchain server to generate, on a blockchain, a non-fungible token (NFT) associated with the digital coupon, the digital coupon redeemable toward the given product for purchase at a point-of-sale (POS) device and having a redeemable value, place the NFT into a redeemable account on the blockchain, assign a unique coupon identifier (UCI) to the NFT, communicate the digital coupon and UCI to the user device for redemption, and upon redemption of the digital coupon at the POS device, obtain the UCI from the given shopper, and determine if the NFT is on the redeemable account on the blockchain based upon the UCI, and when so, cooperate with the POS device to apply the digital coupon to the product for purchase by applying the redeemable value to a purchase of the given product for purchase at the POS device, and transfer the NFT to a non-redeemable account on the blockchain.

2. The digital coupon processing system of claim 1 wherein the redeemable account and the non-redeemable account are owned by a common entity.

3. The digital coupon processing system of claim 1 wherein the digital coupon processing server is configured to obtain at least one product identifier associated with a corresponding product being purchased, determine if the product identifier is associated with the given product for purchase, and when so, determine if the NFT is on the redeemable account.

4. The digital coupon processing system of claim 3 wherein the at least one product identifier comprises at least one of a stock keeping unit (SKU) and a uniform product code (UPC).

5. The digital coupon processing system of claim 1 wherein the digital coupon processing server is configured to, upon redemption, when the NFT is on the redeemable account, authenticate the NFT based upon the UCI and transfer the NFT to a non-redeemable account on the blockchain based upon the authentication.

6. The digital coupon processing system of claim 1 wherein the digital coupon processing server is configured to cooperate with the user device to store the digital coupon in a digital wallet associated with the given shopper.

7. The digital coupon processing system of claim 1 wherein the given shopper has a product purchase history associated therewith; and wherein the digital coupon processing server is configured to generate the digital coupon to be redeemable toward the given product based upon the product purchase history.

8. The digital coupon processing system of claim 1 wherein the digital coupon processing server is configured to, upon redemption, when the NFT is not on either of the redeemable or non-redeemable accounts, generate and communicate a fraud notification.

9. The digital coupon processing system of claim 1 wherein the digital coupon processing server is configured to, upon redemption, when the NFT is on either of the redeemable or non-redeemable accounts, generate and communicate a coupon-used notification.

10. A digital coupon processing server comprising:
a processor and an associated memory configured to
generate a digital coupon for a given product for purchase, cooperate with a blockchain server to generate, on a blockchain, a non-fungible token (NFT) associated with the digital coupon, the digital coupon redeemable toward the given product for purchase at a point-of-sale (POS) device and having a redeemable value, place the NFT into a redeemable account on the blockchain, assign a unique coupon identifier (UCI) to the NFT, communicate the digital coupon and UCI to a user device associated with a given shopper for redemption, and upon redemption of the digital coupon at the POS device, obtain the UCI from the given shopper, and determine if the NFT is on the redeemable account on the blockchain based upon the UCI, and when so, cooperate with the POS device to apply the digital coupon to the product for purchase by applying the redeemable value to a purchase of the given product for purchase at the POS device, and transfer the NFT to a non-redeemable account on the blockchain.

11. The digital coupon processing server of claim 10 wherein the redeemable account and the non-redeemable account are owned by a common entity.

12. The digital coupon processing server of claim 10 wherein the processor is configured to obtain at least one product identifier associated with a corresponding product being purchased, determine if the product identifier is associated with the given product for purchase, and when so, determine if the NFT is on the redeemable account.

13. The digital coupon processing server of claim 10 wherein the processor is configured to, upon redemption, when the NFT is on the redeemable account, authenticate the NFT based upon the UCI and transfer the NFT to a non-redeemable account on the blockchain based upon the authentication.

14. The digital coupon processing server of claim 10 wherein the given shopper has a product purchase history associated therewith; and wherein the processor is configured to generate the digital coupon to be redeemable toward the given product based upon the product purchase history.

15. A method of processing a digital coupon comprising:
using a digital promotion processing server to
generate a digital coupon for a given product for purchase, cooperate with a blockchain server to generate, on a blockchain, a non-fungible token (NFT) associated with the digital coupon, the digital coupon redeemable toward the given product for purchase at a point-of-sale (POS) device and having a redeemable value, place the NFT into a redeemable account on the blockchain, assign a unique coupon identifier (UCI) to the NFT, communicate the digital coupon and UCI to a user device associated with a given shopper for redemption, and upon redemption of the digital coupon at the POS device, obtain the UCI from the given shopper, and determine if the NFT is on the redeemable account on the blockchain based upon the UCI, and upon determining the NFT is on the redeemable account, cooperate with the POS device to apply the digital coupon to the product for purchase by applying the redeemable value to a purchase of the given product for purchase at the POS device, and transfer the NFT to a non-redeemable account on the blockchain.

16. The method of claim 15 wherein the redeemable account and the non-redeemable account are owned by a common entity.

17. The method of claim 15 wherein using the digital coupon processing server comprises using the digital coupon processing server to obtain at least one product identifier associated with a corresponding product being purchased, determine if the product identifier is associated with the given product for purchase, and upon determining the product identifier is associated with the given product for purchase, determine if the NET is on the redeemable account.

18. The method of claim 15 wherein using the digital coupon processing server comprises using the digital coupon processing server to, upon redemption, upon determining the NFT is on the redeemable account, authenticate the NFT based upon the UCI and transfer the NFT to non-redeemable account on the blockchain based upon the authentication.

19. The method of claim 15 wherein the given shopper has a product purchase history associated therewith; and wherein using the digital coupon processing server comprises using the digital coupon processing server to generate the digital coupon to be redeemable toward the given product based upon the product purchase history.

20. A non-transitory computer readable medium for processing a digital coupon, the non-transitory computer readable medium comprising computer executable instructions that when executed by a processor of a digital coupon processing server cause the processor to perform operations comprising:
   generating a digital coupon for a given product for purchase;
   cooperating with a blockchain server to generate, on a blockchain, a non-fungible token (NFT) associated with the digital coupon, the digital coupon redeemable toward the given product for purchase at a point-of-sale (POS) device and having a redeemable value;
   placing the NFT into a redeemable account on the blockchain;
   assigning a unique coupon identifier (UCI) to the NFT,
   communicating the digital coupon and UCI to a user device associated with a given shopper for redemption; and
   upon redemption of the digital coupon at the POS device, obtaining the UCI from the given shopper, and
      determining if the NFT is on the redeemable account on the blockchain based upon the UCI, and when so, cooperating with the POS device to apply the digital coupon to the product for purchase by applying the redeemable value to a purchase of the given product for purchase at the POS device, and transferring the NFT to a non-redeemable account on the blockchain.

21. The non-transitory computer readable medium of claim 20 wherein the redeemable account and the non-redeemable account are owned by a common entity.

22. The non-transitory computer readable medium of claim 20 wherein the operations comprise obtaining at least one product identifier associated with a corresponding product being purchased, determining if the product identifier is associated with the given product for purchase, and when so, determining if the NFT is on the redeemable account.

23. The non-transitory computer readable medium of claim 20 wherein the operations comprise, upon redemption, when the NFT is on the redeemable account, authenticating the NFT based upon the UCI and transferring the NFT to a non-redeemable account on the blockchain based upon the authentication.

* * * * *